(12) United States Patent
Takada

(10) Patent No.: US 7,564,964 B2
(45) Date of Patent: Jul. 21, 2009

(54) ECHO CANCELLER

(75) Inventor: Masashi Takada, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 419 days.

(21) Appl. No.: 10/577,989

(22) PCT Filed: Oct. 27, 2004

(86) PCT No.: PCT/JP2004/015891

§ 371 (c)(1), (2), (4) Date: May 3, 2006

(87) PCT Pub. No.: WO2005/043772

PCT Pub. Date: May 12, 2005

(65) Prior Publication Data

US 2007/0092074 A1   Apr. 26, 2007

(30) Foreign Application Priority Data

Nov. 4, 2003   (JP) .............................. 2003-374632

(51) Int. Cl.
*H04M 9/08* (2006.01)
(52) U.S. Cl. .................................. 379/406.08
(58) Field of Classification Search ............ 379/406.08
See application file for complete search history.

(56) References Cited

U.S. PATENT DOCUMENTS 6,868,158 B2   3/2005   Takahashi et al.
2004/0001450 A1*  1/2004   He et al. ..................... 370/286
2005/0036632 A1*  2/2005   Natarajan et al. ............. 381/93

FOREIGN PATENT DOCUMENTS

| JP | 09-162787 A | 6/1997 |
|---|---|---|
| JP | 09-205388 A | 8/1997 |
| JP | 2000-115033 | 4/2000 |
| JP | 2003-198434 | 7/2003 |
| WO | WO 02/95975 A1 | 11/2002 |

OTHER PUBLICATIONS

Technical Paper of the Telecommunication Standardization Sector of ITU ITU-T Recommendation G. 722 7kHz Audio-Coding with 64 KBIT/S.

* cited by examiner

*Primary Examiner*—Alexander Jamal
(74) *Attorney, Agent, or Firm*—Venable LLP; Michael A. Sartori; Justine A. Gozzi

(57) ABSTRACT

An echo canceller can efficiently remove the offset component from a voice call that can use an audio signal of a communication band wider than the conventional band and can provide a stable call with high communication quality. The echo canceller of the present invention removes an echo component by using an adoptive algorithm, and includes: a pseudo-echo forming means including a pseudo-echo generation section for generating a pseudo-echo signal in accordance with a tap coefficient and a far-end input signal, and a coefficient update section for updating the tap coefficient; a sending filter means for removing a low-frequency component included in a near-end input signal component; a pseudo-echo filter means for removing a low-frequency component included in the pseudo-echo signal from the pseudo-echo forming means; and an echo cancellation means for removing an echo component included in the near-end input signal component passing through the sending filter means, and an echo component in accordance with a pseudo-echo signal passing the pseudo-echo filter means.

5 Claims, 9 Drawing Sheets

ECHO CANCELLER

TECHNICAL FIELD

The present invention relates to an echo canceller, and, for example, is suitable for applying to an echo canceller which removes a low-frequency component in a voice call where a wide voice band can be used.

BACKGROUND ART

In VoIP (Voice over IP) communication (hereafter referred to as VoIP, IP telephony, etc.) sprung into wide use in recent years, an echo component included in an audio signal is a cause of degradation of the speech quality.

This is because VoIP communication has a greater delay than voice communication utilizing a conventional analog line, and this inevitable delay causes the feel of echo to stand out than in the voice communication utilizing the conventional analog line.

Therefore, echo cancellation in VoIP communication has been becoming more important for improving the sound quality. Most VoIP communication apparatuses use an echo canceller to remove the echo component.

The removal of the echo component by the echo-canceller in the conventional VoIP communication will be described with reference to FIG. 2.

As shown in FIG. 2, a conventional echo canceller 13 includes an input terminal $R_{in}$ 1 for receiving a digital audio signal from the talker at a remote end (hereafter referred to as a far end), an output terminal $R_{out}$ 2 for giving the digital audio signal from the input terminal $R_{in}$ 1 to a receiver (hereafter referred to as a near end), an input terminal $S_{in}$ 7 for receiving a digital audio signal from the near end, an output terminal $S_{out}$ 9 for supplying the digital audio signal from the input terminal $S_{in}$ 7 to the far end, an adder 8, a double talk detector 10, and an adaptive filter 14 having a coefficient update section 11 and a filter section 12.

Further, FIG. 2 shows a near-end telephone set 5, a hybrid circuit 4 connected to the telephone set 5, a digital-to-analog converter 3 for converting the digital audio signal from the output terminal $R_{out}$ 2 to an analog signal and supplying the signal to the hybrid circuit 4, and an analog-to-digital converter 6 for converting the analog signal from the hybrid circuit 4 to a digital audio signal and supplying the signal to the input terminal $S_{in}$ 7.

In FIG. 2, a broad-band signal (digital audio signal) input to the input terminal $R_{in}$ 1 is supplied to the output terminal $R_{out}$ 2 and converted to an analog signal by the digital-to-analog converter 3. The signal then passes the hybrid circuit 4 and reaches the telephone set 5. In this manner, the receiver (near end) can hear the voice from the far end.

In the meantime, a part of the output signal from the output terminal $R_{out}$ 2 is reflected by the hybrid circuit 4, converted to a digital signal by the analog-to-digital converter 6, and supplied to the input terminal $S_{in}$ 7. This gives not only the output from the output terminal $S_{out}$ 9 but also a signal received by the input terminal $S_{in}$ 7 to the talker at the far end (not shown). Therefore, the talker at the far end hears its own voice as an echo component y, thereby grating on the ear.

On the other hand, the broad-band signal (digital audio signal) input to the input terminal $R_{in}$ 1 is supplied to the adaptive filter 14. The filter section 12 generates an echo replica (pseudo-echo) signal y' to cancel out the echo component y and gives the signal y' to the adder 8.

The adder 8 subtracts the echo component y from the input terminal $S_{in}$ 7 and the echo replica signal y' from the filter section 12 to remove the echo component y.

A conventional method of generating the echo replica signal y' by means of the filter section 12 will next be described. In the subsequent description, a learning identification technique (normalized LMS (NLMS) technique) is used. The known algorithm is one of the most heavily used algorithms for generating the echo replica signal y'.

A signal x input from the input terminal $R_{in}$ 1 is supplied to the filter section 12. The filter section 12 includes a known FIR (finite impulse response) filter. The tap coefficient h of the adaptive filter 14 (hereafter simply referred to as the coefficient) varies with time.

Next, variations in the tap coefficient h will be described. The m-th tap coefficient of the filter section 12 at time k is denoted by h(k,m), and the input from the input terminal $R_{in}$ 1 at time k is denoted by x(k). The filter section 12 generates the echo replica signal y' as given by expression (1).

$$y' = \sum_{m=0}^{M-1} h(k, m) \cdot x(k - m) \quad (1)$$

M denotes a tap length of the filter section 12 and is a constant determined by the designer in consideration of the response length of the echo path. As the tap length increases, a great echo length can be handled, slowing down the convergence of the echo canceller 13. As the tap length decreases, the convergence speeds up, decreasing the echo length that can be handled.

Next, the method of controlling the coefficient of the adaptive filter 14 will be described. The tap coefficient of the filter section 12 is controlled as given by expression (2) and varies with time.

$$h(k + 1, m) = h(k, m) + \mu \frac{e(k) \cdot y(k)}{\sum_{i=0}^{M-1} x^2(k - i)} \quad (2)$$

The initial value of h and x is zero. In expression (2), $\mu$ is a constant which determines a tracking speed of the echo canceller 13 and satisfies the condition of $0 \leq \mu \leq 1$. A great value of $\mu$ speeds up convergence, degrading the accuracy of echo cancellation in a steady state. A small value of $\mu$ slows down convergence, improving the accuracy of echo cancellation in a steady state.

e(k) is the output of the adder 8. With y(k) and y'(k) representing y and y' at time k, expression (3) is given as follows:

$$e(k) = y(k) - y'(k) \quad (3)$$

Tap coefficient update control performed by using expressions (1), (2), and (3) is a so-called "NLMS technique." The tap coefficient h(k,m) varies in such a manner that e(k) or the power of e(k) gradually reaches 0. The tap coefficient of the filter section 12 is updated to reduce the echo component y gradually by the adder 8 over time (the adaptive filter 14 converges).

The characteristics of the hybrid circuit 4, which is an echo path, are estimated as the tap coefficient of the filter section 12, and the echo component y is removed accordingly.

In the coefficient update control as described above, if a near-end talker signal s is also input to the input terminal $S_{in}$ 7, the right-hand side of expression (3) becomes as shown in expression (4), which includes the near-end talker signal s, and the tap coefficient cannot be updated correctly.

Further, s(k) in expression (4) given below denotes a signal input to the input terminal $S_{in}$ 7 at time k from a source generating great background noise or the voice of the talker at the near end (hereafter referred to as a near-end talker signal).

$$e(k)=y(k)-y'(k)+s(k) \quad (4)$$

Accordingly, when the near-end talker signal s(k) is included as in expression (4), the coefficient update must be stopped. Alternatively, the coefficient update is stopped after a predetermined initial convergence period, so that the effect of the signal s(k) is eliminated.

The double talk detector 10 shown in FIG. 2 stops the coefficient update when the near-end talker signal s is included. The double talk detector 10 can perform any detection operation that can stop the coefficient update of expression (4) by detecting a talker signal on the path from the input terminal $S_{in}$ 7 to the output terminal $S_{out}$ 9. The operation will not be described here in further detail.

In FIG. 2, the signal e after the adder 8 is used as the input to the double talk detector 10 as before, but the input of the double talk detector 10 can be taken from any place on the sending path or receiving path.

In VoIP communication, the echo canceller performs the operation of echo cancellation as described above.

Some conventional apparatuses and methods of echo cancellation are described in patent documents 1 and 2 and non-patent document 1 given below.

Patent document 1: Japanese Patent Application Kokai (Laid-Open) Publication No. 2003-198434

Patent document 2: Japanese Patent Application Kokai (Laid-Open) Publication No. 2000-115033

Non-patent document 1: ITU-T Recommendation G.722, 7 kHz AUDIO-CODING WITHIN 64 KBIT/S

DISCLOSURE OF INVENTION

Problem to be Solved by the Invention

Conventional voice communication utilizing an analog line has a limit on the audio signal communication band (300 to 3400 Hz, hereafter referred to as the conventional band). VoIP communication has no limit on the audio signal band of the VoIP line and can provide sound of a higher quality, which is also desired by the user.

A recommendation with respect to a speech coding technique in a broad band (50 to 7000 Hz) wider than the conventional band (300 to 3400 Hz) has been made in non-patent document 1 and the like. A high-quality communication apparatus utilizing a broad-band speech coding technique has already been brought into actual use. If a private line is laid, the apparatus can be used between special terminals equipped with a headphone and a microphone.

It is difficult to realize a high-quality call with a broad-band VoIP telephone of a so-called telephone set type because an echo arises and degrades the sound quality as described below.

When a broad-band VoIP telephone of a so-called telephone set type is provided, a hybrid circuit, which is a two-wire/four-wire converter, is placed in a communication channel in most cases, in consideration of the existing communication facilities. Because the hybrid circuit is a source of echo, as described above, an echo is inevitable in this type of system.

Accordingly, the broad-band VoIP telephone of a so-called telephone set type requires an echo canceller technique for removing an echo. The conventional echo canceller technique as described above is not originally intended for broad-band sound, and the conventional echo canceller technique applied to the broad-band VoIP telephone cannot remove an echo appropriately.

In view of the foregoing problem, the group of the applicant of the present patent has found the following cause of degradation of the performance of the echo canceller applied to the broad-band VoIP telephone.

When a direct-current offset component is added to the input signal, the direct-current offset component generally appears as a fixed direct-current value superimposed on the signal waveform, and the linearity of the echo path is lost. It is known that the echo cancellation capability of the echo canceller is degraded in this way. This offset component has been thought to be caused just by the characteristics of the analog-to-digital converter and background noise (noise component from the input terminal $S_{in}$ 7, for example).

In broad-band communication, however, the echo canceller sometimes behaves as affected by the offset component or a component assumed to be an offset because of the characteristics of the broad-band signal even if the analog-to-digital converter is normal. This may make it impossible to make full use of the capabilities of the echo canceller.

This occurs because the audio signal frequency band of the broad-band VoIP communication is wider than that of the conventional voice call. The broad-band audio signal used in VoIP communication contains a very-low-frequency component of 50 to 300 Hz. This low-frequency component turns out to affect the performance of the echo canceller.

The group of the applicant of the present patent has found the effect of the low-frequency component on the performance of the echo canceller, which will be described with reference to FIG. 2 and FIG. 3.

FIG. 3 is a diagram for describing the effect of the low-frequency component (that is, a long-period waveform) of the broad-band signal (audio signal) on the echo canceller.

As the coefficient update advances, the tap coefficient (not shown) of the filter section 12 in the echo canceller 13 converges in such a manner that a true echo path function is simulated.

If the input signal contains any direct-current component or a low-frequency component that can be regarded to be almost direct current, the convergence capability is degraded as described above.

This type of low-frequency amplitude offset component (hereafter simply referred to as an offset) can be represented by a mean value of signal samples in a constant segment. The target direct-current offset component in conventional art is a direct-current offset component of a fixed value provided by an analog-to-digital converter, and the value does not vary over time. The offset component of the broad-band audio signal changes the value to be superimposed over time in the data segment processed by the echo canceller, and this offset component affects the echo canceller (segments "a" and "c" in FIG. 3).

In segment "b" shown in FIG. 3, the offset component (mean value) fortunately disappears, and the tap coefficient of the filter section 12 of the echo canceller 13 converges to a true echo path function successfully.

More specific examples will be described. Suppose that broad-band VoIP uses a sampling frequency of 16 kHz, as disclosed in ITU-T recommendation G.722 (non-patent document 1).

If the echo canceller 13 has a tap length of 256, a frequency of waveform shorter than the filter tap length can be expressed. Waveform of a longer period (frequency) cannot be expressed. More specifically, the lower-limit frequency is $$1/(256 \times (1/16000)) = 62.5 \text{ Hz}.$$

The filter section 12 cannot express frequencies lower than this level.

Further, in broad-band VoIP telephone, a component of a lower frequency band (20 to 70 Hz) is often used together with the other frequency band, to reproduce a sense of realism. The conventional echo canceller 13 for processing just a fixed value direct-current offset component cannot express the low frequencies. It looks as if the offset component is put on the signal, degrading the performance of the echo canceller significantly.

A possible solution to the problem is to increase the tap length of the echo canceller 13 (filter section 12) and increase low frequencies that can be expressed by the echo canceller 13.

An increased tap length of the filter section 12, however, increases amounts of product-sum operations immediately as given by expressions (1) and (2). If the echo canceller 13 is implemented by a digital signal processor (DSP), which is not shown, increased amounts of operations, increased hardware scale, and some other problems will arise.

Further, what is important to provide high-quality sound is to match the timings of the signal x(k), the signal e(k), and the echo component y(k) in the adaptive filter of the echo canceller in accordance with the coefficient update algorithms given by expressions (1) to (3).

Accordingly, there is demand for an echo canceller that can efficiently remove the offset component from a voice call that can use an audio signal of a communication band wider than the conventional band, can eliminate displacement of timing associated with echo cancellation, and can provide a stable call with high communication quality.

Means for Solving the Problem

In order to solve the above mentioned problems, an echo canceller according to the present invention removes an echo component by using an adoptive algorithm, and includes: a pseudo-echo forming means including a pseudo-echo generation section for generating a pseudo-echo signal in accordance with a tap coefficient and a far-end input signal, and a coefficient update section for updating the tap coefficient; a sending filter means for removing a low-frequency component included in a near-end input signal component; a pseudo-echo filter means for removing a low-frequency component included in the pseudo-echo signal from the pseudo-echo forming means; and an echo cancellation means for removing an echo component included in the near-end input signal component passing through the sending filter means, and an echo component in accordance with a pseudo-echo signal passing the pseudo-echo filter means.

Effects of the Invention

An echo canceller according to the present invention can efficiently remove a non-fixed offset component that can occur in a voice call that can use an audio signal of a communication band wider than the conventional band, can eliminate displacements of timing associated with echo cancellation, and can provide a stable call with high communication quality.

Further, the echo canceller according to the present invention can efficiently perform echo cancellation even in a call using the conventional telephone set.

Figure 1:
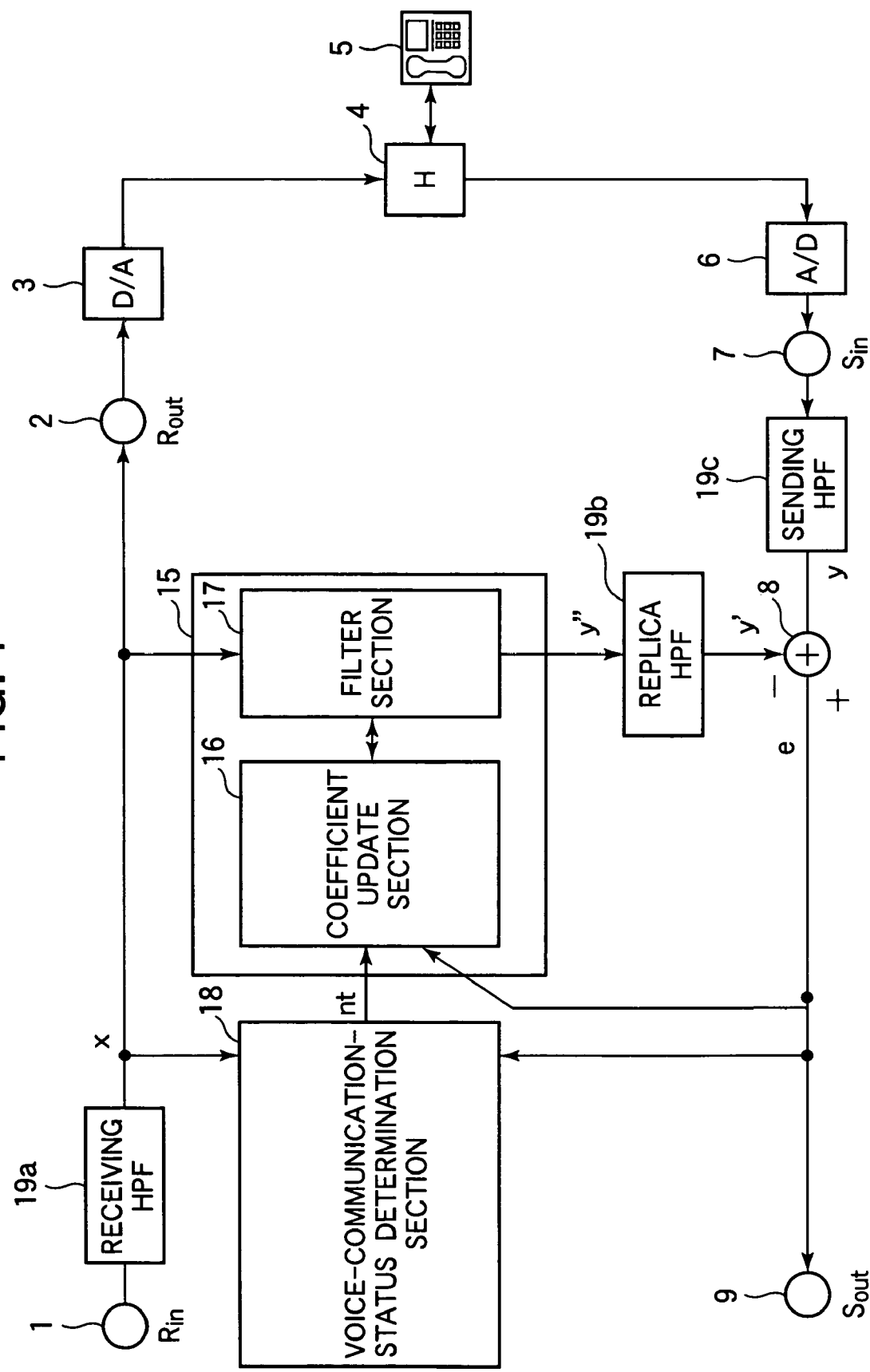
FIG. 1 is a block diagram for describing an echo canceller of the first embodiment.
Figure 2:
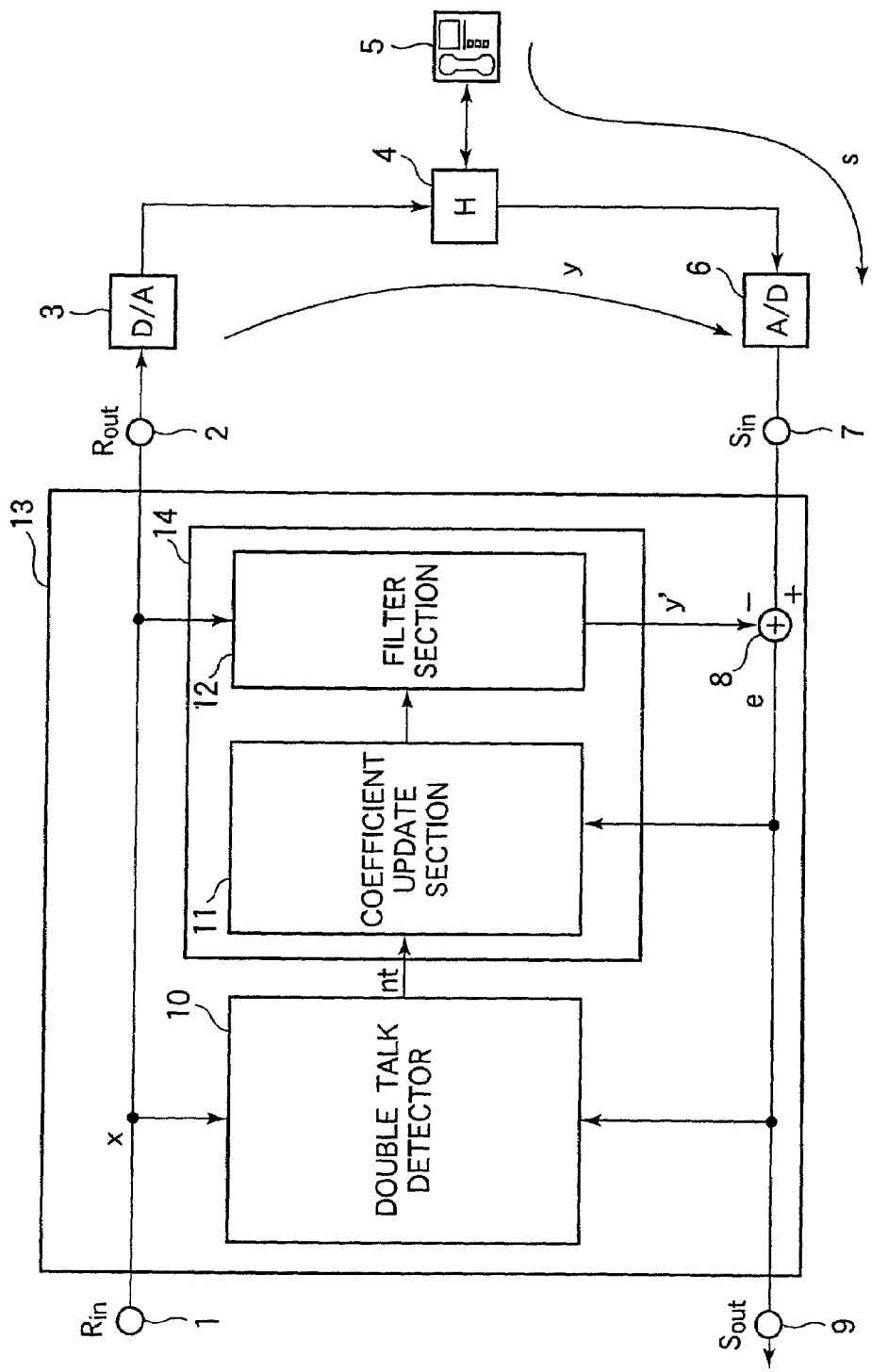
FIG. 2 is a block diagram for describing a conventional echo canceller.

EXPLANATION OF THE REFERENCE MARKS 1 input terminal (far end side); 7 input terminal (near end side); 15 adaptive filter; 16 coefficient update section; 17 filter section; 19b replica HPF; 19c sending HPF.

BEST MODE FOR CARRYING OUT THE INVENTION

The best modes for carrying out echo cancellers of the present invention will be described below.

Embodiments of the echo canceller for high-grade telephone with a high speech quality described below can reduce the effect of the offset component in broad-band communication and can remove the echo precisely in a call that can use a broad-band audio signal.

The embodiments are described below for communication of an audio signal having a frequency band of 50 to 7000 Hz recommended by an international recommendation with respect to the speech coding technique in non-patent document 1. However, the present invention is not limited to this frequency band, and can also be applied widely for removing the low-frequency component accompanied by the expanded frequency band of the audio signal.

Furthermore, the following points are considered in the embodiments described below.

In the embodiments described below, an HPF for removing the low-frequency component is provided between a near-end input terminal and an adder, in order to prevent the performance of the echo canceller from being degraded because of the offset component, as described earlier. An echo canceller providing an HPF for removing just the low-frequency component absolutely in the echo path is also effective.

In the following embodiments, however, the conventional HPF is used instead of the HPF for removing just the low-frequency component absolutely, to deter the degradation of the performance of the echo canceller because of the offset component effectively.

If a powerful HPF is provided in the echo path, the large-scale configuration of the powerful HPF will extend the response length of the echo path by the response length of the HPF. The echo canceller would need to estimate the filter characteristics of the HPF in the echo path simultaneously. The tap length of the echo canceller should be increased to cover the HPF, and the scale of the echo canceller would increase.

To avoid this problem, some techniques such as a technique disclosed in patent document 2 save the operations of the echo canceller when the echo path is long. The techniques merely detect pure delay from the far-end output terminal to the hybrid circuit and save processing corresponding to the pure delay. The techniques have no effect when the sample length of the echo path is actually extended, such as when a filter having a real response is inserted between the near-end input terminal and the adder.

Further, some techniques such as one described in patent document 1 insert a waveform processing function section into an echo path and prevent the waveform processing function section from affecting the tap of the echo canceller. The waveform processing function should not have processing delay like a signal amplifier, in terms of the mechanism. In other words, the techniques are not effective for the waveform processing function accompanying processing delay, such as in the HPF. The coefficient update algorithms of the echo canceller 13 described above hold only when the timings of the signal x(k), the signal e(k), and the echo component y(k) match, as indicated in expressions (1) to (3).

More specifically, an amplifier is provided between the near-end input terminal and the adder, and a similar amplifier is provided between the filter section and the adder to amplify the echo replica signal in conventional art. The echo is subtracted by the adder, the subtracted signal is attenuated by an attenuator, and the original amplitude is restored, then the signal is input to the coefficient update section. Use of an identification algorithm (for example, an NLMS technique) will not cause a time discrepancy. Therefore, just under this condition, the echo canceller operates appropriately.

However, if the waveform processing function causes a delay like an HPF, the signal output from the filter section is delayed (time lag) by the HPF, the echo is subtracted by the adder, and the time of the subtracted signal must be put forward when the signal is input to the coefficient update section. This is impractical.

Accordingly, the echo canceller in the following embodiments uses the conventional HPF to remove the low-frequency offset component efficiently and enables stable telephone conversation of high communication quality by eliminating displacements of timing-related to echo cancellation.

(A) FIRST EMBODIMENT

An echo canceller according to the first embodiment of the present invention will be described below with reference to drawings.

(A-1) Configuration of First Embodiment

FIG. 1 is a block diagram showing a general configuration including the echo canceller of the first embodiment. The talker at the far end is not shown in FIG. 1.

As shown in FIG. 1, an entire configuration containing an echo canceller includes an input terminal $R_{in}$ 1, an output terminal $R_{out}$ 2, a digital-to-analog converter 3, a hybrid circuit 4, an analog-to-digital converter 6, an input terminal $S_{in}$ 7, an adder 8, an output terminal $S_{out}$ 9, an adaptive filter 15, a voice-communication-status determination section 18, a receiving high-pass filter 19a (hereafter referred to as a receiving HPF), a replica high-pass filter 19b (hereafter referred to as a replica HPF), and a sending high-pass filter 19c (hereafter referred to as a sending HPF). Further, the hybrid circuit 4 is connected to a telephone set 5.

It is preferable that the receiving HPF 19a, the replica HPF 19b, and the sending HPF 19c (sometimes simply referred to as HPFs 19a to 19c) are HPFs of the same type. In the first embodiment, the HPFs 19a to 19c have a gain of 1.0.

If the HPFs 19a to 19c include a filter having a gain, an attenuator may be provided between the adder 8 and the coefficient update section 16, for example, to provide attenuation opposite to the gain.

The input terminal $R_{in}$ 1 inputs a digital audio signal from the far end and supplies the input digital audio signal through the receiving HPF 19a to the voice-communication-status determination section 18, the adaptive filter 15, and the output terminal $R_{out}$ 2.

The receiving HPF 19a removes low-frequency component equal to or less than a predetermined frequency level (equal to or less than 50 Hz, for example) from the digital audio signal from the input terminal $R_{in}$ 1 and supplies the signal to the voice-communication-status determination section 18, the adaptive filter 15, and the output terminal $R_{out}$ 2. In the first embodiment, the digital audio signal output from the receiving HPF 19a is referred to as x (sometimes simply referred to as "signal x").

The output terminal $R_{out}$ 2 receives the digital audio signal x and supplies the signal to the digital-to-analog converter 3.

The digital-to-analog converter 3 converts the digital audio signal given from the output terminal $R_{out}$ 2 to an analog signal and gives the analog signal to the hybrid circuit 4.

The hybrid circuit 4 has a two-wire/four-wire conversion function. The hybrid circuit 4 provides signal integrity with the connection line (two wires) to the telephone set 5 and gives an analog signal from the digital-to-analog converter 3 to the telephone set 5 or an audio signal (analog signal) from the telephone set 5 to the analog-to-digital converter 6.

The analog-to-digital converter 6 converts an audio signal given from the hybrid circuit 4 to a digital signal and gives the signal to the input terminal $S_{in}$ 7.

The input terminal $S_{in}$ 7 gives a digital audio signal from the analog-to-digital converter 6 to the sending HPF 19c.

The sending HPF 19c removes low-frequency components equal to or less than a predetermined frequency (equal to or less than 50 Hz, for example) from a digital audio signal given from the input terminal 19c and gives the signal to the adder 8. In the first embodiment, the echo component output from the sending HPF 19c is denoted as y.

The adder 8 receives the echo component y from the sending HPF 19c and an echo replica signal (hereafter also referred to as replica) y' after a predetermined low-frequency component is removed by the replica HPF 19b, which will be described later, subtracts the echo component y and the echo replica signal y', and gives a signal e after echo cancellation to the adaptive filter 15, the voice-communication-status determination section 18, and the output terminal $S_{out}$ 9.

The output terminal $S_{out}$ 9 sends the signal e, from which the echo component is removed, from the adder 8 to the telephone of the talker at the far end, which is not shown.

The voice-communication-status determination section 18 monitors the receiving path (signal path from the input terminal $R_{in}$ 1 to the output terminal $R_{out}$ 2) and the sending path (signal path from the input terminal $S_{in}$ 7 to the output terminal $S_{out}$ 9), and detects a state in which just the receiving path has an audio signal.

When the voice-communication-status determination section 18 detects a state in which just the receiving path has an audio signal, a coefficient update stop signal nt is not output to the adaptive filter 15. Otherwise (just the sending path has an audio signal; both the receiving path and the sending path have no audio signal; both the receiving path and the sending path have an audio signal), the coefficient update stop signal nt is output to the adaptive filter 15.

The voice-communication-status determination section 18 outputs the coefficient update stop signal nt even when both the receiving path and the sending path have no audio signal. If the receiving path has no audio signal, no echo component arises, and the adaptive filter 15 does not require a coefficient update.

A voice-communication-status detection method in which the voice-communication-status determination section 18 detects a state in which the receiving path and the sending path have an audio signal and a voice-communication-status determination method for detecting a state in which just the receiving path has an audio signal will next be described.

The voice-communication-status detection method performed in the voice-communication-status determination section 18 will be described first.

The voice-communication-status determination section 18 receives the digital audio signal x from the input terminal $R_{in}$ 1 through the receiving HPF 19a and the signal e after echo cancellation from the adder 8, and detects whether the receiving path or the sending path has an audio signal with respect to each sample.

The voice-communication-status determination section 18 obtains the mean value of the power of the audio signals in accordance with expressions (5) and (6) given below, from the received output of the input terminal $R_{in}$ 1 (digital audio signal x) and the output (signal e) of the adder 8.

$$pow\_x(k)=(pow\_x(k-1)\times\delta)+(x^2(k)\times(1-\delta)) \quad (5)$$

$$pow\_e(k)=(pow\_e(k-1)\times\delta)+(e^2(k)\times(1-\delta)) \quad (6)$$

where k denotes a sample number, and x(k) and e(k) denote the k-th sample of signals x and e respectively. Further, δ is a constant representing the degree of smoothness, with a range of the constant is $1\geq\delta\geq 0$ (in the first embodiment, δ is 0.5, but is not limited to this value).

As indicated by expressions (5) and (6), if δ is large, general variations in the digital audio signals x and e are reflected, and the effect of noise decreases. If δ is small, steep changes in the signals x and e are correctly reflected, and the effect of noise increases.

The voice-communication-status determination method performed in the voice-communication-status determination section 18 will next be described.

The voice-communication-status determination section 18 determines a voice-communication-status in accordance with Pow_x(k) and Pow_e(k) obtained from expressions (5) and (6) given above. When the state in which just the receiving path has an audio signal is determined, the coefficient update stop signal nt is not output.

In other words, when the conditions "pow_x(k)>(the silence threshold value), and pow_x(k)>(pow_e(k)+(the margin value))" are satisfied, the voice-communication-status determination section 18 determines that just the receiving path has an audio signal in accordance with Pow_x(k) and Pow_e(k). In the first embodiment, the silence threshold value is −38 dBm0, and the margin value is 6 dB, but these are not limited to theses values.

In the first embodiment, the voice-communication-status determination section 18 uses the smoothed value of the power of x(k) and e(k) and detects the output signals of the input terminal $R_{in}$ 1 and the input terminal $S_{in}$ 7. The absolute values of power of x(k) and e(k) may be used to determine the voice communication status. The voice-communication-status determination section 18 can use a wide variety of methods for determining the voice communication status by detecting the presence or absence of output signals from the input terminal $R_{in}$ 1 and the input terminal $S_{in}$ 7.

The configuration of the adaptive filter 15 will next be described. The adaptive filter 15 receives the digital audio signal x from the receiving HPF 19a and the residual signal e after echo component from the adder 8, creates an echo replica signal y″ in a method described later, and gives the signal to the replica HPF 19b.

Figure 4:
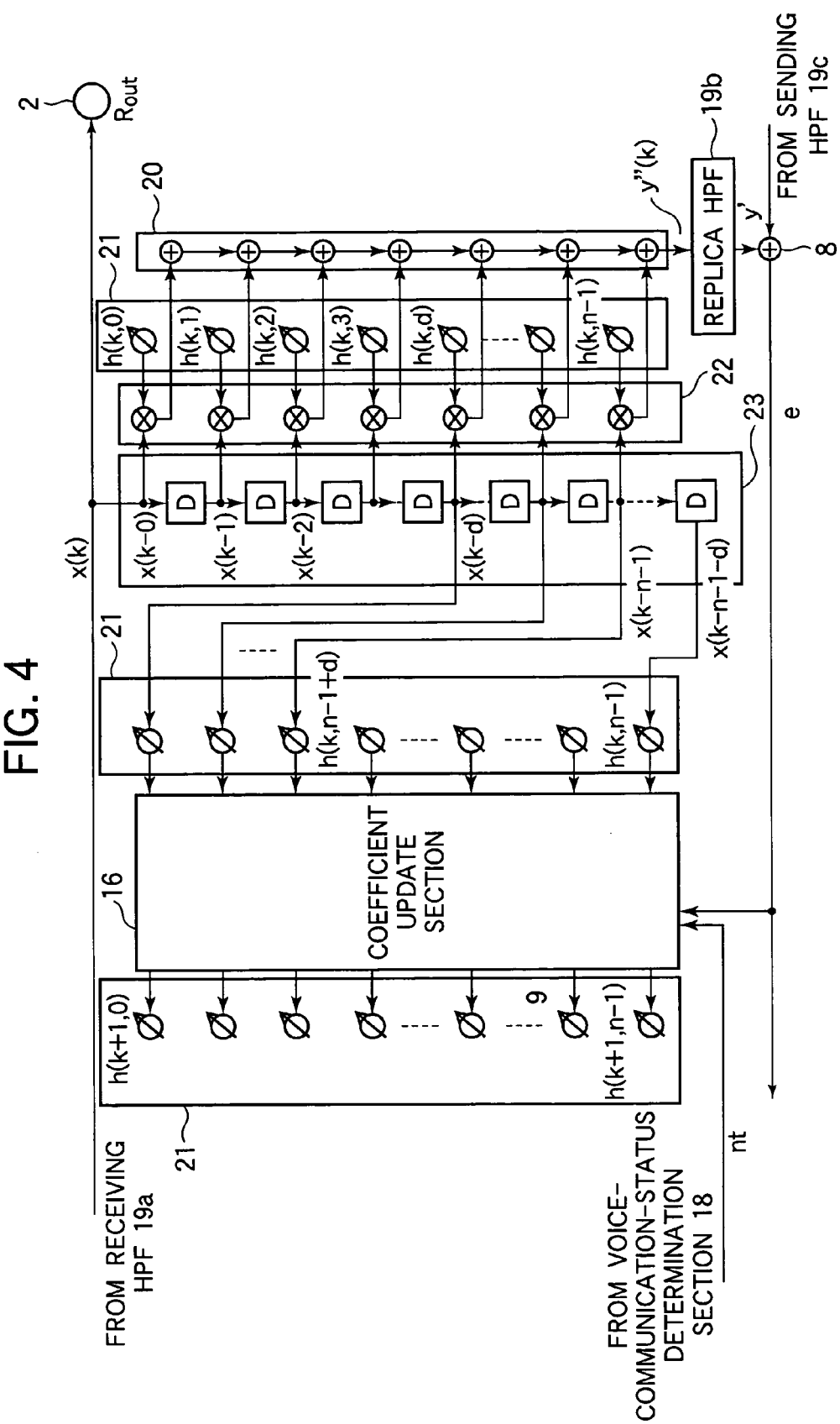
FIG. 4 is a configuration diagram for describing an adaptive filter of the first embodiment.

The adaptive filter 15 includes a coefficient update section 16 and a filter section 17, and a detailed configuration is shown in FIG. 4. In FIG. 4, elements identical to elements shown in FIG. 1 are denoted by the same reference marks.

As shown in FIG. 4, the adaptive filter 15 includes a product-sum operation section 20, a filter coefficient 21, a multiplier 22, and a delay register 23.

In FIG. 4, the timings of the signal x from the receiving HPF 19a, the echo component y, and the signal e after echo cancellation are important. A description is made by indicating the timings of the signals when necessary.

The filter section 17 will be described first. As shown in FIG. 4, the filter section 17 includes an adder 8, a product-sum operation section 20, a coefficient register 21, a multiplier 22, and a delay register 23.

The delay register 23 receives the signal x(k) of each sample from the receiving HPF 19a and supplies the signal to the multiplier 22 with a delay. The number of registers in the delay register 23 is greater than the number of registers in the coefficient register 21 by the number of registers (d stages of registers) corresponding to the delay caused by filtering, which will be described later. In the first embodiment, the delay register 23 has (n+d) registers.

The coefficient register 21 holds the coefficient of each sample, and the coefficient can be updated by the coefficient update section 16. In FIG. 4, the coefficient held in the coefficient register 21 is expressed as h(k,n), where k means a sample number, and n represents an n-th coefficient.

The multiplier 22 receives an output signal of each sample from the delay register 23 and the coefficient of each sample from the coefficient register 21, and multiplies the output signal of each sample by a coefficient depending on the delay. Further, the multiplier 22 gives the result of multiplication of each sample to the product-sum operation section 20.

The product-sum operation section 20 receives the result of multiplication of each sample from the multiplication section 22, performs a product-sum operation, and generates a first echo replica signal y″(k). The product-sum operation section 22 gives the generated first echo replica signal y″(k) to the replica HPF 19b.

The multiplier 22 and the product-sum operation section 20 perform an operation as given by expression (7) below, and a first echo replica signal y″(k) is created.

$$y''(k) = \sum_{m=0}^{M-1} h(k,m) \cdot x(k-m) \quad (7)$$

The replica HPF 19b receives the first echo replica signal y″(k) from the product-sum operation section 20, removes the low-frequency component equal to or less than a predetermined frequency level (for example, equal to or less than 50 Hz), and gives a second echo replica signal y′ to the adder 8.

The output signal from the replica HPF 19b has a delay of a sample time caused by filtering for the first echo replica signal y″. In the first embodiment, the delay is described as d-samples.

Because of the delay, the adder 8 receives the second echo replica signal y'(k) after a lapse of d-samples from the output of the first echo replica signal y"(k) from the product-sum operation section 20.

The adder 8 receives the second echo replica signal y'(k−d), which is the first echo replica signal y"(k) delayed by d-samples, an echo component y(k−d) with the same delay caused by filtering by the sending HPF 19c, and outputs a signal e(k−d) after echo cancellation in accordance with expression (8) given below with respect to the second echo replica signal y'(k−d) and the echo component y(k−d).

$$e(k-d) = y(k-d) - y'(k-d) \qquad (8)$$

Naturally, the signal e is delayed by d-samples because of the sending HPF 19c and the replica HPF 19b, as indicated by expression (8).

Further, filtering by the receiving HPF 19a produces a delay, but the timing that concerns the adder 8 in subtraction of the echo component y and the second echo replica signal y' is based on the time at which the filter section 17 and the voice-communication-status determination section 18 receive the signal x and start processing. Therefore, the delay produced by the receiving HPF 19a can be ignored.

The coefficient update section 16 will next be described. The coefficient update section 16 updates the coefficient of the filter section 17 in accordance with the coefficient update stop signal nt from the voice-communication-status determination section 18. More specifically, the coefficient update section 16 does not update the coefficient of the filter section 17 when the coefficient update signal nt is received from the voice-communication-status determination section 18 and updates the coefficient of the filter section 17 when the coefficient update signal nt is not received.

In FIG. 4, when the coefficient update signal nt is not received from the voice-communication-status determination section 18 (or when the coefficient is updated), the coefficient update section 16 receives the signal e(k−d) after echo cancellation from the adder 8 and updates the coefficient of the coefficient register 21, as indicated by expression (9) given below.

$$h(k+1, m) = h(k, m) + \mu \frac{e(k-d) \cdot y(k-d)}{\sum_{i=0}^{M-1} x^2(k-i-d)} \qquad (9)$$

FIG. 4 shows a plurality of coefficient registers 21 and the individual coefficient registers 21 store the coefficients of the samples such as h(k+1, m), (0≦m≦n) or h(k,m), (0≦m≦n) separately for convenience of description. Actually, the same coefficient register 21 stores a coefficient. The actual operation of the coefficient register 21 is to overwrite the stored coefficient h(k, m) by h(k+1, m) updated in accordance with expression (9) given above.

Further, when (k−d) in the expression given above is rewritten as L, expression (9) becomes expression (10) given below.

$$h(k+1, m) = h(k, m) + \mu \frac{e(L) \cdot y(L)}{\sum_{i=0}^{M-1} x^2(L-i)} \qquad (10)$$

A comparison between expression (10) and expression (2) shows that the timings of the signal e after echo cancellation, the signal x, and the echo component y agree with one another, and there is compatibility in time among the identification algorithms.

(A-2) Operation of First Embodiment

Next, the operation of the echo canceller of the present embodiment will be described.

The digital audio signal (broad-band audio signal) is input to the input terminal $R_{in}$ 1, a predetermined low-frequency band is removed by the receiving HPF 19a, and the signal is supplied to the voice-communication-status determination section 18, the filter section 17, and the output terminal $R_{out}$ 2. The operation of the voice-communication-status determination section 18 and the filter section 17 will be described later.

The digital audio signal x supplied to the output terminal $R_{out}$ 2 is given to the digital-to-analog converter 3 and converted to an analog signal. The digital-to-analog converter 3 gives the analog signal to the telephone set 5 through the hybrid circuit 4.

On the other hand, the analog signal output from the digital-to-analog converter 3 is reflected by the hybrid circuit 4, and a part of the signal (analog signal) is converted to a digital signal by the analog-to-digital converter 6 and given to the input terminal $S_{in}$ 7.

The digital audio signal output from the input terminal $S_{in}$ 7 passes the adder 8 and the output terminal $S_{out}$ 9 and reaches the talker at the far end, which is not shown.

The echo component y appears from the input to the input terminal $S_{in}$ 7, the sending HPF 19c removes low frequencies equal to or less than a predetermined low-frequency cut-off frequency (equal to or less than 50 Hz, for example) from the echo component, and the remainder is supplied to the adder 8.

The adder 8 subtracts the echo component y and a second echo replica signal y' from the replica HPF 19b, and the residual signal e after the echo cancellation is given to the output terminal $S_{out}$ 9, passes the signal path such as an IP network, which is not shown, and goes toward the telephone of the talker at the far end, which is not shown. The audio signal after echo cancellation reaches the talker at the far end.

The second echo replica signal y' is given by the replica HPF 19b by removing low frequencies equal to or less than the low-frequency cut-off frequency (equal to or less than 50 Hz, for example) from the first echo replica signal y" created by the filter section 17. The method of creating the first echo replica signal y" will be described later.

Further, the signal e after echo cancellation by the adder 8 is given to the voice-communication-status determination section 18 and the coefficient update section 16.

The voice-communication-status determination section 18 receives the signal e after echo cancellation from the adder 8 and the signal x from the input terminal $R_{in}$ 1 and detects whether or not the receiving path and the sending path have an audio signal.

The voice-communication-status determination section 18 obtains the smoothed value of the power of each sample of the signal x from the input terminal $R_{in}$ 1 and the signal e from the adder 8, in accordance with expressions (5) and (6).

The voice-communication-status determination section 18 obtains the smoothed values pow_x(k) and pow_e(k) from the signal x and the signal e respectively. Then, the voice-communication-status determination section 18 checks whether or not pow_x(k) and pow_e(k) satisfy a predetermined condition.

The predetermined condition is that pow_x(k)>(the silence threshold value), and pow_x(k)>(pow_e(k)+(the margin value)).

When the predetermined condition is satisfied, the voice-communication-status determination section 18 determines that just the receiving path has an audio signal and does not output the coefficient update stop signal nt to the coefficient update section 16. If the predetermined condition is not satisfied, the coefficient update stop signal nt is output to the coefficient update section 16.

While the coefficient update stop signal nt is not output to the coefficient update section 16, the coefficient update section 16 updates the coefficient held in the coefficient register 21 of the filter section 17.

Further, when the coefficient update stop signal nt is output to the coefficient update section 16, the coefficient update section 16 does not update the coefficient, and the coefficient held in the coefficient register 21 of the filter section 17 is maintained. The coefficient update operation of the coefficient update section 16 will be described later.

The digital audio signal x from the input terminal $R_{in}$ 1 is also supplied to the filter section 17 of the adaptive filter 15, as described earlier. The operation to generate the echo replica signal y' from the signal x input to the filter section 17 will be described with reference to FIG. 4.

The signal x(k) input to the adaptive filter 15 is given to the delay register 23 of the filter section 17, and the delay register 23 delays the signal.

The signal x(k) delayed by the delay register 23 is supplied to the multiplier 22 of each sample.

The coefficient of each sample held in the coefficient register 21 is given to the multiplier 22 corresponding to the delay by the delay register.

The multiplier 22 multiplies the signal x(k) from the delay register 23 by the coefficient from the corresponding coefficient register 21 and supplies the product of each sample to the product-sum operation section 20.

The product-sum operation section 20 performs a product-sum operation of the product supplied from the multiplier 22, generates the result as a first echo replica signal y"(k), and gives the signal to the replica HPF 19b.

The first echo replica signal y"(k) generated by the adder 22 and the product-sum operation section 20 is obtained in accordance with expression (7).

The replica HPF 19b removes the low-frequency component equal to or less than a predetermined frequency level (equal to or less than 50 Hz, for example) from the first echo replica signal y"(k) supplied from the product-sum operation section 20, and a second echo replica signal y'(k) after the low-frequency component removal is given to the adder 8.

The filtering by the replica HPF 19b delays the first echo replica signal y"(k) output from the product-sum operation section 20 and supplies the second echo replica signal y'(k) with a delay of d-samples time.

The echo component y which input to adder 8 is delayed by the same d-samples time as in filtering by the sending HPF 19c, and provides the residual signal e(k−d) after echo cancellation, as indicated by expression (8).

The adder 8 outputs the signal e(k−d) to the coefficient update section 16, as described earlier.

The operation of the coefficient update section 16 will be described below. The operation described here is performed when the coefficient update section 16 does not receive the coefficient update stop signal nt from the voice-communication-status determination section 18, or when a coefficient update is performed.

When the adder 8 gives the signal e(k−d) to the coefficient update section 16, the coefficient update section 16 updates the coefficient in the coefficient register 21 in each sample period.

The coefficient update section 16 updates the coefficient held in the coefficient register 21 in accordance with expression (9).

The coefficient update by the coefficient update section 16 provides the complete agreement of timing among the signal e, the signal x, and the echo component y, as indicated by expression (10), and time consistency can be maintained among the identification algorithm.

A delayed signal is used for updating the coefficient of the coefficient register 21, and a non-delayed signal is used for creating an echo replica signal in the filter section 17. With the two-stage time structure, HPFs causing a delay in the replica path and the echo path will not disturb the timings of x(k) and e(k) on the identification algorithm, and the echo canceller can be driven with a known NLMS technique.

(A-3) Effects of First Embodiment

According to the first embodiment, the receiving HPF 19a provided in the receiving path and the sending HPF 19c provided in the sending path (between the input terminal $S_{in}$ 7 and the adder 8) remove the low-frequency component which can degrade the performance of the echo canceller; the replica HPF 19b provided between the adaptive filter 15 and the adder 8 can compensate for a delay associated with filtering by the sending filter 19c to eliminate the effect on the echo; and series of samples at different points of time are used for filtering by the filter section 17 and for the processing by the coefficient update section 16. Even if a broad-band audio signal is input, a disturbance caused by the low-frequency component like a disturbance by the offset component will not occur. The echo component can be removed steadily, and the speech quality can be improved.

(B) SECOND EMBODIMENT

Next, an echo canceller of the second embodiment of the present invention will be described.

In the first embodiment, it is assumed that broad-band telephone sets are connected at both ends of the speech path. In actual usage, it cannot be known whether the call-originating telephone set and the call-terminating telephone set are a broad-band telephone set or the conventional telephone set (telephone supporting a communication band of 300 to 3400 Hz). The conventional telephone set may be used at either end or both ends of the speech path.

In view of the foregoing, the echo canceller of the second embodiment can maintain time consistency by a delay associated with filtering even if the conventional telephone set is connected to either end or both ends of the speech path, and if the conventional telephone set is connected, unnecessary processing is reduced.

If the echo canceller is implemented by a digital signal processor (DSP), which is not shown, for example, to reduce unnecessary processing depending on the telephone connected to an end of the speech path, as in the second embodiment, is useful in saving the amount of operations of the DSP, the amount of usage of the memory, and power consumption.

(B-1) Configuration of Second Embodiment

Figure 5:
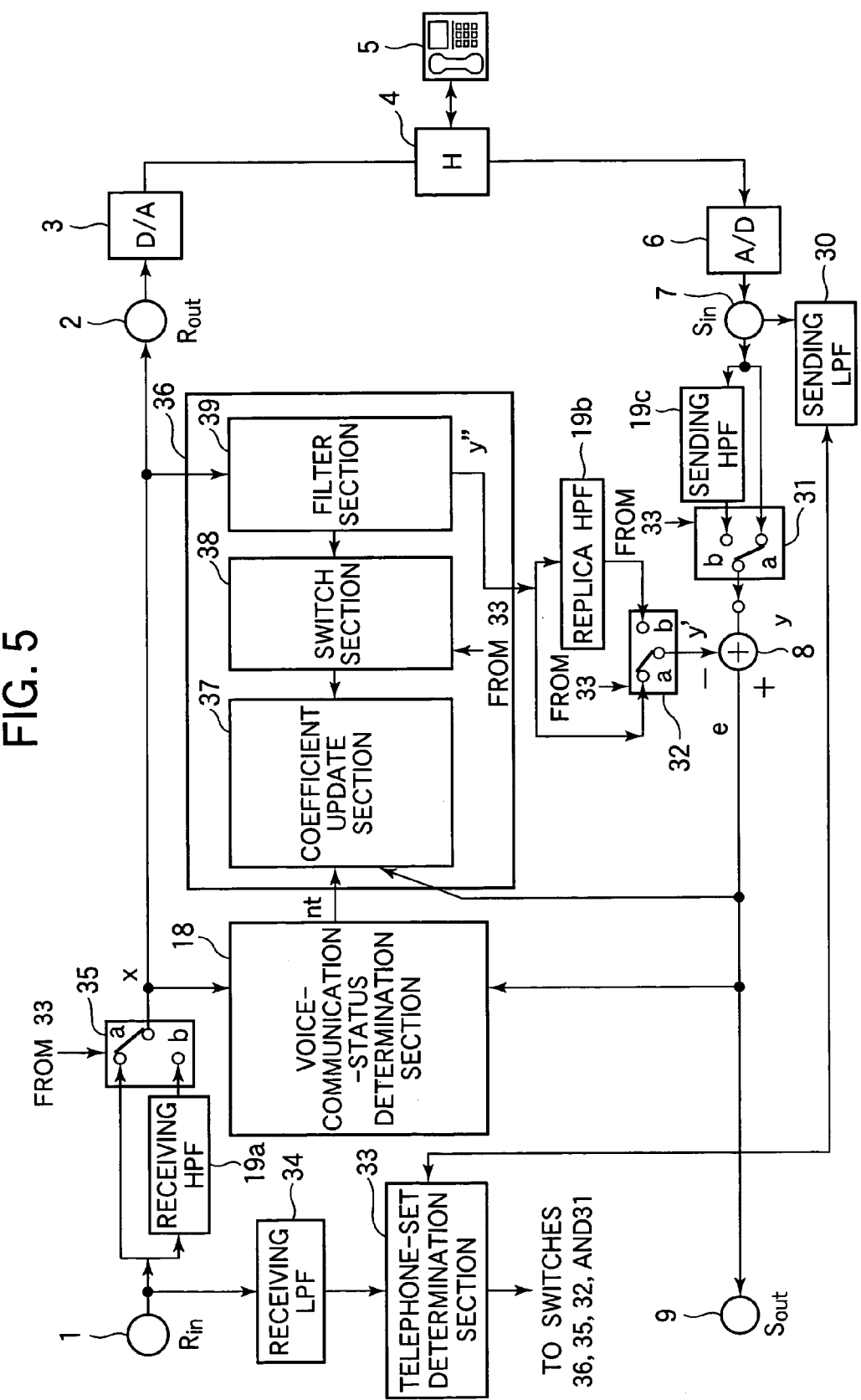
FIG. 5 is a block diagram for describing an echo canceller of the second embodiment.

FIG. 5 is a block diagram showing a configuration containing the echo canceller of the second embodiment.

The configuration of the second embodiment shown in FIG. 5 differs from the configuration of the first embodiment shown in FIG. 1 in that the second embodiment includes a switch 31, a switch 32, a switch 35, a receiving LPF 34, a sending LPF 30, a telephone-set determination section 33, an adaptive filter 36, a coefficient update section 37, and a switch section 38.

In FIG. 5, elements identical to the elements included in the first embodiment shown in FIG. 1 are denoted by the same reference marks. Those identical elements will not be described in detail.

The receiving LPF 34 is a low-pass filter for passing the low-frequency component equal to or less than a predetermined frequency level (equal to or less than 300 Hz, for example). The receiving LPF 34 receives a digital audio signal input from the input terminal $R_{in}$ 1, passes the low-frequency component equal to or less than the predetermined frequency level (equal to or less than 300 Hz, for example) of the input digital audio signal, and gives the component to the telephone-set determination section 34. If voice received from the far end has a communication band wider the conventional band, a low-frequency component having a power greater than a specified level can be given to the telephone-set determination section 33.

Further, the sending LPF 30 is also a filter for passing a low-frequency component equal to or less than a predetermined frequency level (equal to or less than 300 Hz, for example). The filter passes the low-frequency component of the digital audio signal from the input terminal $S_{in}$ 7 and gives the component to the telephone-set determination section 34. If voice sent from the near end (on the side of the telephone set 5) has a communication band wider than the conventional band, a low-frequency component having a power greater than a specified-level can be given to the telephone-set determination section 33.

The telephone-set determination section 33 determines whether a telephone connected to an end of the speech path is a broad-band telephone set or the conventional telephone set, in accordance with the power of the signal input from the receiving LPF 34 and the sending LPF 30, and gives a switching signal depending on the determination to the switches 31, 32, and 35 and the switch section 38 of the adaptive filter 36.

More specifically, the telephone-set determination section 33 has a predetermined detection threshold for determining the telephone (−40 dBm0, for example), compares the power of the signal input from the receiving LPF 34 and the sending LPF 30 with the detection threshold. If the power of either signal exceeds the detection threshold, the section determines that a broad-band telephone set is connected to the end of the speech path where the detection threshold is exceeded, and outputs a switching signal accordingly.

In other words, when the telephone-set determination section 33 determines that a broad-band telephone set is connected to either end or both ends of the speech path, a switching signal is output to the switches 31, 32, and 35, and the switch section 38 of the adaptive filter 36 to switch the switches to a contact "b".

When it is determined that the conventional telephone set is connected to both ends of the speech path, nothing is output to the switches 31, 32, and 35 and the switch section 38. That is, a contact "a" is closed.

The switch 31 is provided in the sending path and selects whether a signal from the input terminal $S_{in}$ 7 or a signal from the sending HPF 19c is supplied to the adder 8. The switch 31 is closed to the side of the input terminal $S_{in}$ 7 (contact "a" side) in the initial state. When a switching signal is received from the telephone-set determination section 33, a switch to the side of the sending HPF 19c (contact "b" side) is made.

The switch 32 is provided in the replica path and selects whether a signal from the filter section 39 or a signal from the replica HPF 19b is given to the adder 8. The switch 32 is closed to the side of the filter section 39 (contact "a" side) in the initial state. When a switching signal is received from the telephone-set determination section 33, a switch to the side of the replica HPF 19b (contact "b" side) is made.

The switch 35 is provided in the receiving path and selects whether a signal from the input terminal $R_{in}$ 1 or a signal from the receiving HPF 19a is output to the receiving path. The switch 35 is closed to the side of input terminal $R_{in}$ 1 (contact "a" side) in the initial state. When a switching signal is received from the telephone-set determination section 33, a switch is made to the side of the receiving HPF 19a (contact "b" side).

In the second embodiment, the communication paths including the HPFs 19a to 19c or the communication paths excluding the HPFs 19a to 19c are selected in accordance with the determination by the telephone-set determination section 33. However, the configuration may be different. For example, the HPFs 19a to 19c may be replaced by variable filters having a plurality of filters, and the telephone-set determination section 33 may control the switches 31, 32, and 35 in accordance with the power of the low-frequency component.

Figure 6:
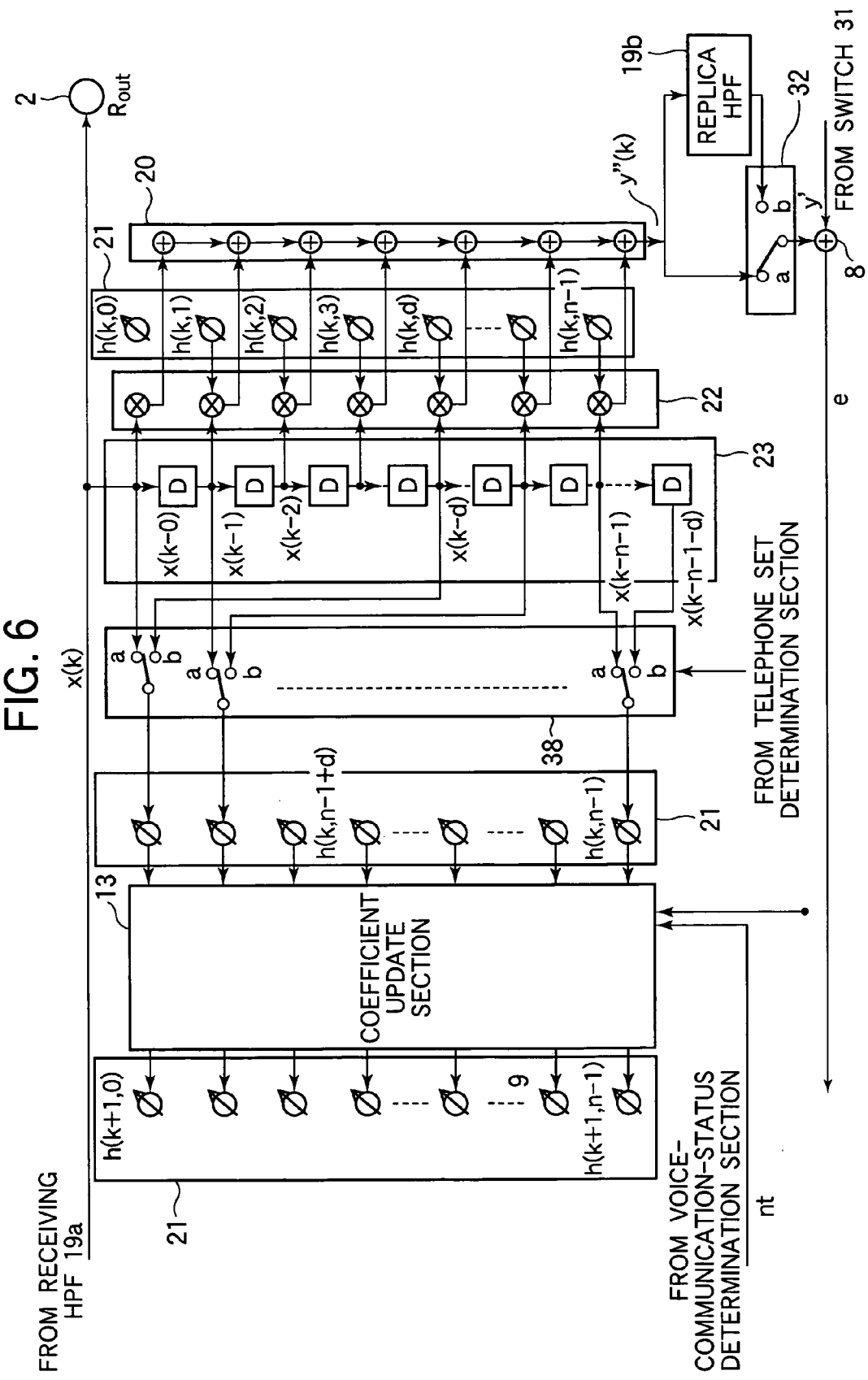
FIG. 6 is a configuration diagram for describing an adaptive filter of the second embodiment.

Next, the configuration of the adaptive filter section 36 will be described. FIG. 6 is a diagram for describing the configuration of the adaptive filter in detail.

The switch section 38 gives each sample of the signal x(k) delayed by the delay register 23 to the coefficient register 21. The switch section 38 is closed on the side of the delay register 23 (contact "a" side) corresponding to each coefficient register 21 in the initial state. When a switching signal is received from the telephone-set determination section 33, a switch is made to the side of delay register 23 (contact "b" side) in consideration of d-samples time.

(B-2) Operation of Second Embodiment

The switches 31, 32, and 35, and the switch section 38 are closed to the contact "a" side in the initial state.

A digital audio signal input to the input terminal $R_{in}$ 1 is output through the switch 35 to the subsequent receiving path.

On the other hand, a digital audio signal input to the input terminal $R_{in}$ 1 is supplied to the receiving LPF 34, and the low-frequency component equal to or less than a predetermined low-frequency level (equal to or less than 300 Hz, for example) is supplied to the telephone-set determination section 33.

Further, voice from the telephone set 5 is converted to a digital signal by the analog-to-digital converter 6, and the signal is input to the input terminal $S_{in}$ 7 and is supplied through the switch 33 to the adder 8.

On the other hand, a digital audio signal input to the input terminal $S_{in}$ 7 is supplied to the sending LPF 30, and the low-frequency component equal to or less than a predetermined low-frequency level (equal to or less than 300 Hz, for example) is supplied to the telephone-set determination section 33.

The telephone-set determination section 33 compares the power of the signal from the receiving LPF 34 and the power of the signal from the sending LPF 30 with a predetermined detection threshold value (−40 dBm0, for example). If the detection threshold value is exceeded, it is determined that a broad-band telephone set is connected to the end of the speech path corresponding to the signal.

When the telephone-set determination section 33 determines that a broad-band telephone set is connected to either end or both ends of the speech path, a switching signal to change the contact is output to the switches 31, 32, 35, and the switch section 38.

Further, when the telephone-set determination section 33 determines that the conventional telephone set is connected to both ends of the speech path, no switching signal is output to the switches 31, 32, and 35, and the switch section 38.

In other words, the switches 31, 32, and 35, and the switch section 38 close the contact "b" when the telephone-set determination section 33 determines that a broad-band telephone set is connected to either end of the speech path, and the operation is performed as described in the first embodiment.

After the switches 31, 32, and 35, and the switch section 38 close the contact "b", the switch contacts are fixed until the call is shut off. After the call ends, the switches 31, 32, and 35, and the switch section 38 return to the initial state.

The operation when the switches 31, 32, and 35 close the contact "b" has been described in the first embodiment. The operation when the conventional telephone set is connected to both ends of the speech path will next be described.

The telephone-set determination section 33 compares the power of the signals from the receiving LPF 34 and the sending LPF 30 with a detection threshold. If it is determined that the conventional telephone is connected to both ends of the speech path, the telephone-set determination section 33 does not output a switching signal to the switches 31, 32, and 35, and the switch section 38. In the switches 31, 32, and 35, and the switch section 38, the contact "a" is left closed.

The switches do not allow the signal x from the input terminal $R_{in}$ 1, the echo component y from the input terminal $S_{in}$ 7, and the echo replica signal y" from the adaptive filter 36 to pass the receiving HPF 19a, the sending HPF 19c, and the replica HPF 19b respectively.

This avoids an unnecessary delay on the signal path because filtering by the receiving HPF 19a, the sending HPF 19c, and the replica HPF 19b is not necessary when the conventional telephone sets are connected to both ends of the speech path.

The operation of the coefficient update section 37 when it is determined that the conventional telephone sets are connected to both ends of the speech path will next be described with reference to FIG. 6.

In that case, the switch section 38 closes the contact "a", and the switches 31, 32, and 35 described above also close the contact "a".

As shown in FIG. 6, the signal x(k) output from the switch 35 is supplied to the delay register 23 of the filter section 39 and is delayed.

The signal x(k) from the delay register 23 is supplied to the multiplier 22, where the signal is multiplied by the coefficient corresponding to the delay from the coefficient register 21 of each sample. The product is supplied to the product-sum operation section 20, where the echo replica signal y"(k) is generated and supplied through the switch 32 to the adder 8.

The adder 8 subtracts the echo replica signal y'(k) (equals to y"(k) here because no filtering is performed) and the echo component y(k) given by the input terminal $S_{in}$ 7, and the residual signal e(k) after echo cancellation is output.

Because the replica HPF 19b and the sending HPF 19c do not intervene in the operation so far, no delay occurs, causing no displacement in timing.

The coefficient update section 37 receives the signal e(k) from the adder 8 and the signal x(k) from the delay register 23 through the switch section 38 (which closes the contact "a") and performs a coefficient update in accordance with expression (2).

Because the switch section 38 and the switches 31, 32, and 35 close the contacts to the contact "a" side, the sending path, the receiving path, and the echo replica signal output path have no delay, thereby causing no displacements in timing.

Therefore, the timing of the signal e(k) and the echo component y(k) agree with each other, so the identification algorithm of the echo canceller can execute expression (2) and can remove the echo component.

As described above, the telephone-set determination section 23 determines the telephones connected to both ends of the speech path, and if the conventional telephone sets are connected to both ends, unnecessary processing is automatically avoided, so that the resources of the digital signal processor and the power consumption can be saved.

(B-3) Effects of Second Embodiment

According to the second embodiment, the switches 31, 32, and 35 provide a broad-band signal path containing the receiving HPF 19a, the replica HPF 19b, and the sending HPF 19c and a conventional-band signal path without those filters; either the broad-band signal path or the conventional-band signal path is selected in accordance with the determination made by the telephone-set determination section 33 for determining the type of the telephone set connected to an end of the speech path; if the conventional telephone sets are connected to both ends of the speech path, a coefficient update is made by using the signals without delay. Even if the conventional telephone sets are connected to both ends of the speech path, the echo component can be efficiently removed without any special design change, and the power and the amounts of digital operations can be saved.

(C) THIRD EMBODIMENT

An echo canceller of the third embodiment of the present invention will next be described.

In the first embodiment, a voice band conforming to voice CODEC (broad-band sound coding for a voice band of 50 to 7000 Hz) described in non-patent document 1 (international standard ITU-T G.722) is used.

However, the actual communication path is often a private line. In that case, the lowest frequency of the communication band may be different from the lower-limit frequency indicated in non-patent document 1. In other words, the lowest frequency of the actual communication band may not be the lower-limit frequency as indicated in non-patent document 1, and the lower-limit frequency of an HPF cannot be specified.

The echo canceller of the third embodiment can automatically remove an unwanted low-frequency component that can affect the echo canceller like an offset component, from the broad-band frequency component, and has excellent echo cancellation capability even if the lowest permissible frequency of the line is not known.

(C-1) Configuration of Third Embodiment

Figure 7:
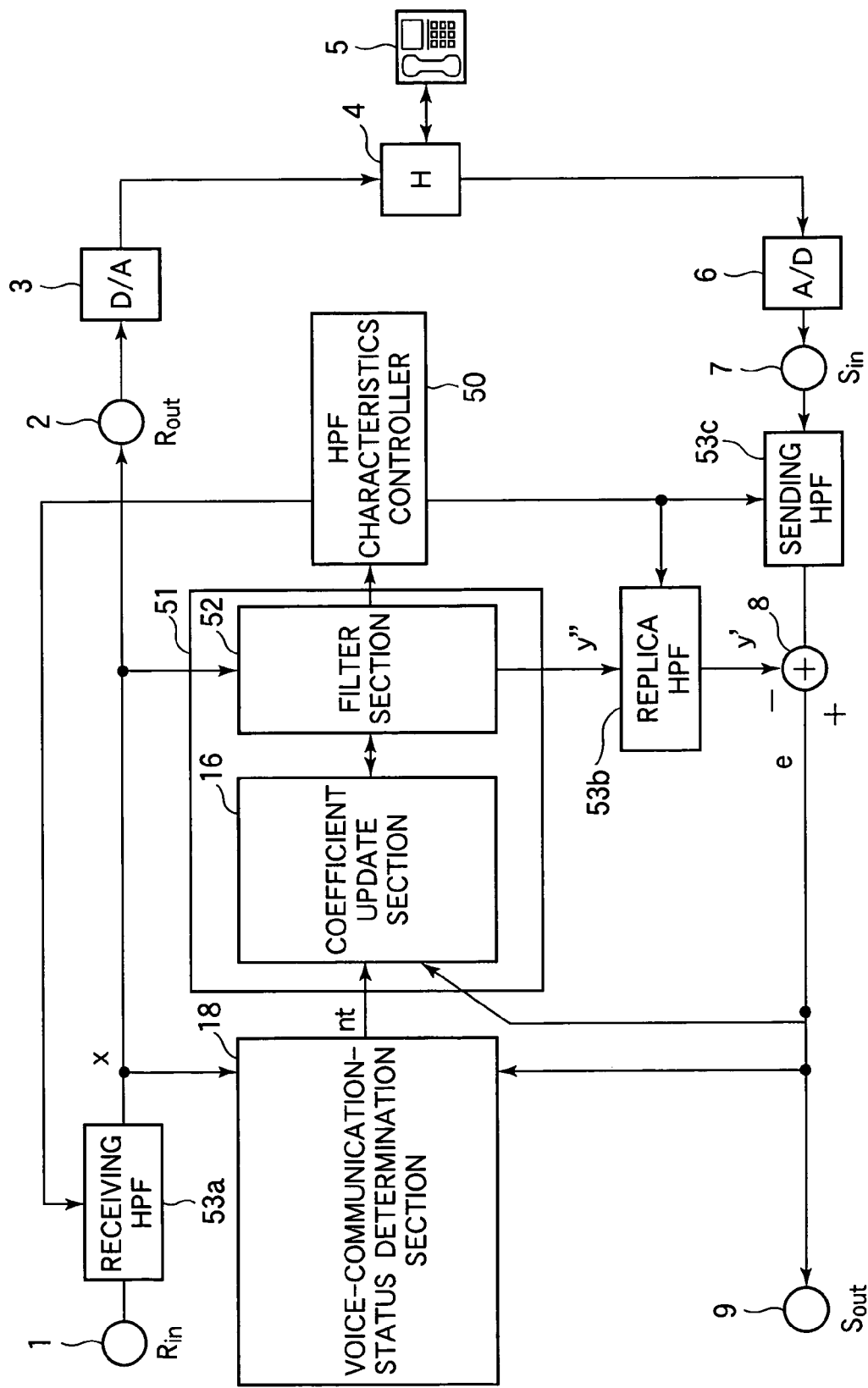
FIG. 7 is a block diagram for describing an echo canceller of the third embodiment.

FIG. 7 is a block diagram showing a configuration including the echo canceller of the third embodiment.

The configuration of the third embodiment shown in FIG. 7 differs from the configuration of the first embodiment shown in FIG. 1 in that an HPF characteristics controller 50 is provided and that the filter section 19, the receiving HPF 19a, the sending HPF 19c, and the replica HPF 19b are replaced by a filter section 52, a receiving HPF 53a, a sending HPF 53c, and a replica HPF 53b respectively. Elements identical to elements of the first embodiment shown in FIG. 1 are denoted by the same reference marks, and those elements will not be described here in detail.

The filter section 52 has a tap length specified by the designer. The tap length is given to the HPF characteristics controller 50. The tap length can be freely specified by the designer, and a predicted value of the response length of the hybrid circuit 4 can be specified appropriately.

The HPF characteristics controller 50 receives the tap length specified in the filter section 52, obtains the cut-off frequencies (CF) of the receiving HPF 53a, the replica HPF 53b, and the sending HPF 53c in accordance with the tap length, and controls the cut-off frequency characteristics of the receiving HPF 53a, the replica HPF 53b, and the sending HPF 53c.

The HPF characteristics controller 50 obtains the cut-off frequencies (CF) of the HPFs 53a, 53b, and 53c from the tap length of the filter section 52, in accordance with expression (11) below, for example:

$$CF(Hz) = M/sf \tag{11}$$

M denotes a tap length of the filter section 52, and sf denotes a sampling frequency. In the third embodiment, a frequency of 16000 Hz is used as sf, but it is not limited to this value.

The receiving HPF 53a, the replica HPF 53b, and the sending HPF 53c have a cut-off frequency (CF) determined by the HPF characteristics controller 50, as controlled by the HPF characteristics controller 50.

The receiving HPF 53a, the replica HPF 53b, and the sending HPF 53c may have a plurality of filters having different cut-off frequencies, and a filter section may select one of the filters as controlled by the HPF characteristics controller 50.

The receiving HPF 53a, the replica HPF 53b, and the sending HPF 53c may use a variable filter having a variable cut-off frequency. In that case, one HPF may be provided, a time-constant parameter for determining the low cut-off frequency the HPF may be provided, and the cut-off frequency may be changed by changing the time-constant constant parameter as controlled by the HPF characteristics controller 50.

In the third embodiment, the filter section 52 has three tap lengths (128, 256, and 512) in advance; one of the three tap lengths is selected; the HPF characteristics controller 50 obtains the cut-off frequency; the receiving HPF 53a, the replica HPF 53b, and the sending HPF 53c select one of the three filters having cut-off frequencies of 130 Hz, 63 Hz, and 35 Hz respectively. Any other appropriate tap length can be specified in the filter section 50, and another appropriate combination of the cut-off frequencies can be specified in the HPFs 53a, 53b, and 53c.

(C-2) Operation of Third Embodiment

The operation of the echo canceller of the third embodiment will be next described.

The signal x from the input terminal $R_{in}$ 1 is supplied to the adaptive filter 51.

A tap length M associated with filtering by the adaptive filter 51 is given to the HPF characteristics controller 50.

The tap length M can be specified appropriately by the user, as described earlier, and a predicted value of the response length of the hybrid circuit 4 may be specified appropriately. The third embodiment uses a tap length of 256, but it is not limited to this value.

The HPF characteristics controller 50 obtains the cut-off frequency CF of the HPFs 53a, 53b, and 53c from the tap length M of the filter section 52 in accordance with expression (11). In the expression, sf denotes the sampling frequency, which is specified to 16000 Hz.

When the HPF characteristics controller 50 obtains a cut-off frequency (CF), the HPF characteristics controller 50 controls the characteristics of the sending HPF 53c, the replica HPF 53b, and the receiving HPF 53a in such a way that the cut-off frequencies of the HPFs 53a, 53b, and 53c support the obtained cut-off frequency.

The cut-off frequencies of the receiving HPF 53a, the replica HPF 53b, and the sending HPF 53c are specified as described above, and an unwanted low-frequency component is removed as in the first embodiment.

The input and output of the signal after removal of the low-frequency component and the coefficient update operation are the same as in the first embodiment.

(C-3) Effects of Third Embodiment

According to the third embodiment, the HPF characteristics controller 50 is provided; the tap length M of the filter section 52 is output to the HPF characteristics controller 50; the HPF characteristics controller 50 calculates the low cut-off frequencies of the sending HPF 53c, the receiving HPF 53a, and the replica HPF 53b; and the sending HPF 53c, the receiving HPF 53a, and the replica HPF 53c have low cut-off frequencies calculated from the tap length M of the echo canceller by the HPF characteristics controller 50 regardless of the communication line type. Because a low-frequency component that cannot be expressed by the filter section 52 can be automatically removed, the echo component cancellation capability will not be degraded even if the communication line type or the telephone type is not known, and an echo-free speech quality can be provided.

(D) FOURTH EMBODIMENT

An echo canceller of a fourth embodiment of the present invention will next be described with reference to FIG. 8.

In the second embodiment, the telephone-set determination section 33 determines the types of telephone sets at both ends of the speech path in accordance with the low-frequency components detected by the fixed LPFs 30 and 34.

Actually, it is not known often whether the actual speech band is the conventional band or a broad band. When a broad band is used, the band of the line may be unique, not conforming to the broad-band sound coding described in non-patent document 1 (standard G.722) or the like.

In that case, the types of telephone sets at both ends cannot be determined just by the power of the signal of a fixed value of the low cut-off frequency related to an existing standard (equal to or less than 50 Hz, for example), as in the second embodiment.

Figure 3:
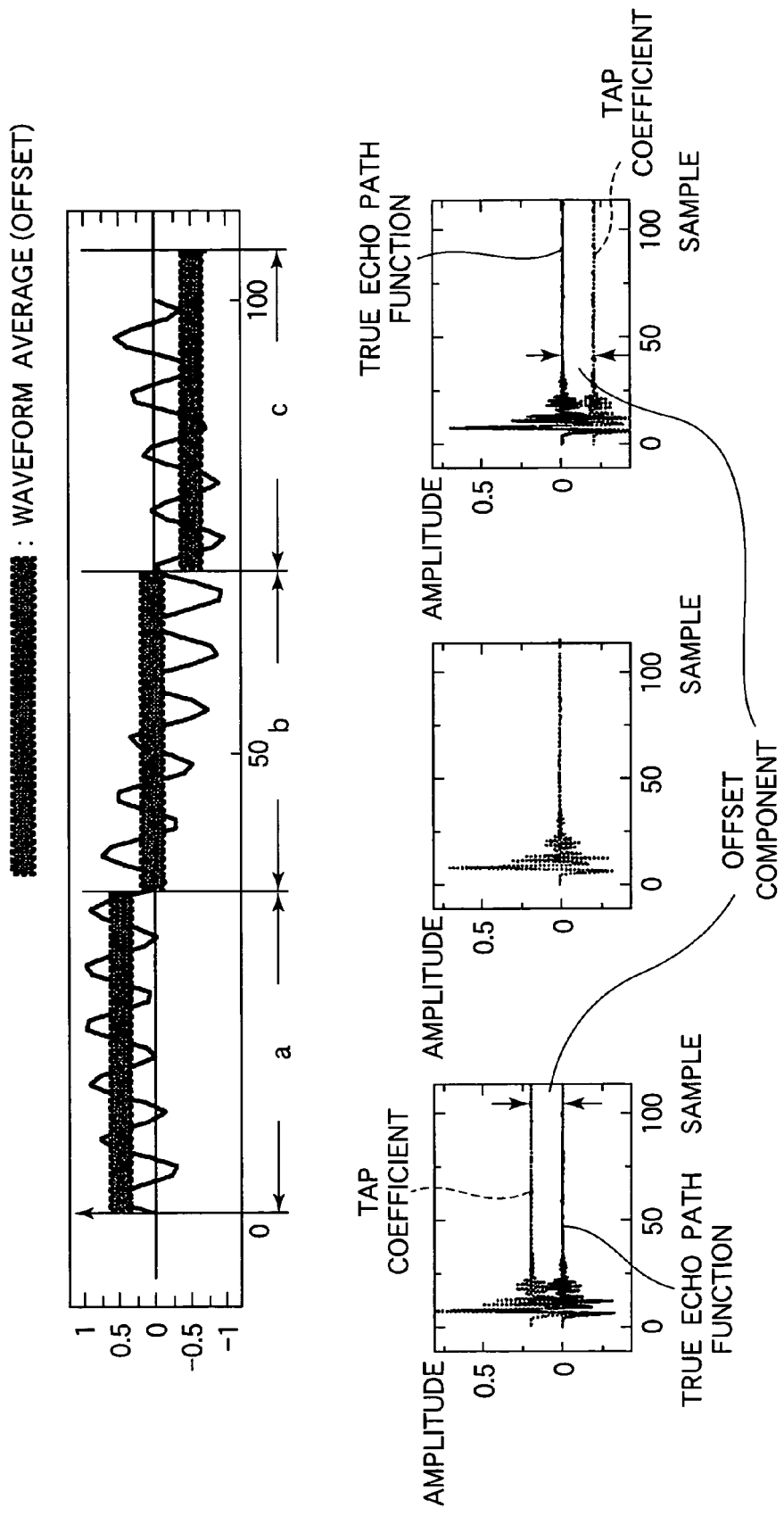
FIG. 3 is a diagram for describing the effect of removal of low frequencies from a broad-band audio signal.

Further, if the echo canceller is driven directly by a broad-band signal, the coefficient of the filter section 39 varies with time as if an offset component is applied, as described with reference to FIG. 3.

In view of the foregoing, the fourth embodiment uses the characteristics of the offset component coefficient. Whether or not a broad-band telephone set is connected to an end of the speech path is determined by whether or not there is an offset component, and the operation is made in such a way that the effect of the offset component is automatically avoided.

(D-1) Configuration and Operation of Fourth Embodiment

Figure 8:
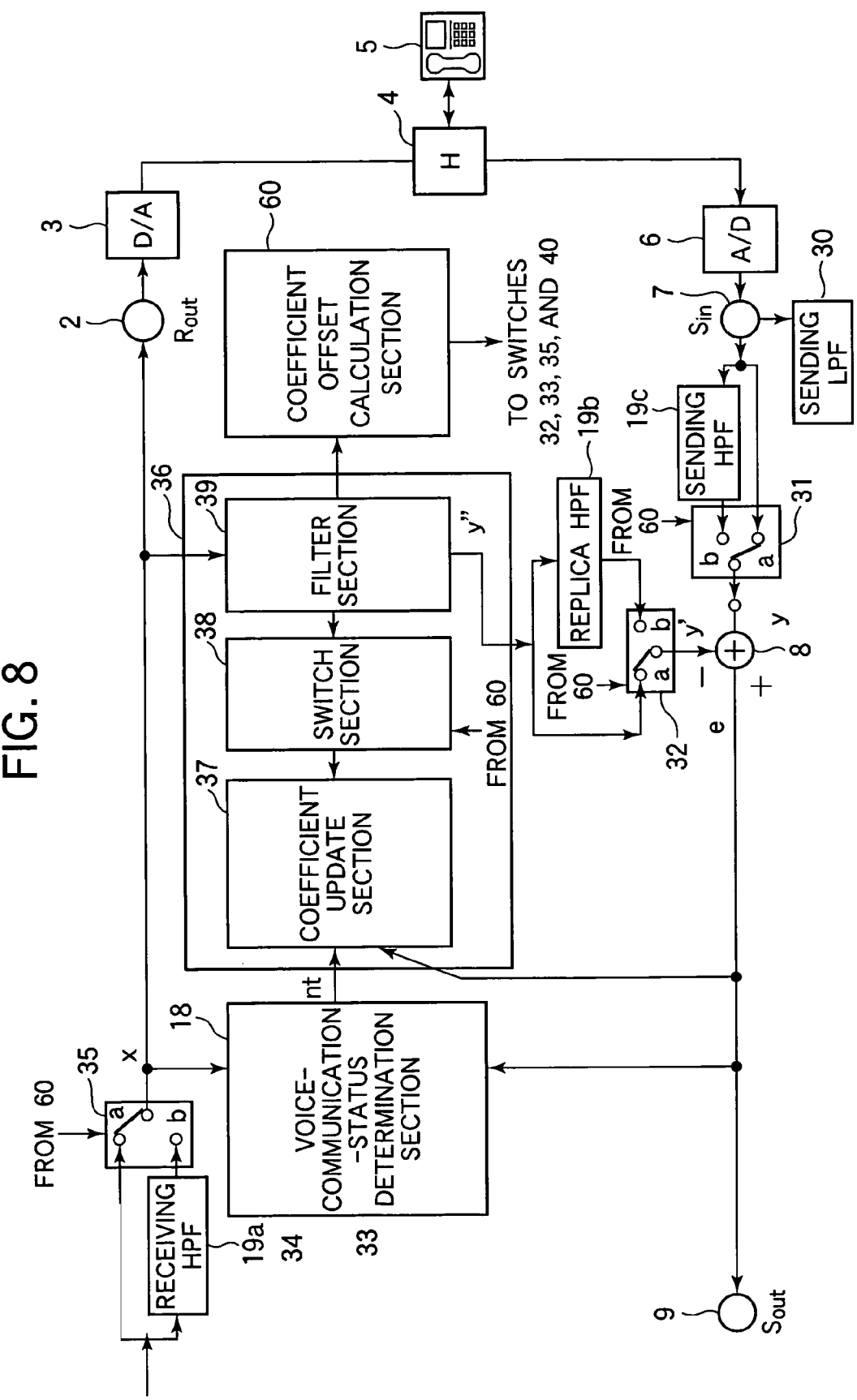
FIG. 8 is a block diagram for describing an echo canceller of the fourth embodiment.

FIG. 8 is a block diagram showing an entire configuration containing an echo canceller of a fourth embodiment.

The configuration of the fourth embodiment shown in FIG. 8 differs from the configuration of the second embodiment shown in FIG. 5 in that a coefficient offset calculation section 60 is provided instead of the receiving LPF 34, the sending LPF 30, and the telephone-set determination section 33. In FIG. 8, elements identical to elements shown in FIG. 5 are denoted by the same reference marks, and those elements will not be described in detail here.

The coefficient offset calculation section 60 has a counter (not shown) for counting the number of coefficient updates of the adaptive filter section 36. The mean value of the coefficient samples is obtained as given by expression (12) below, and it is determined whether the coefficient contains an offset component in accordance with the mean value of the coefficient samples.

The counter may be a counter for counting the number of coefficient updates executed in a predetermined period (one second, for example), a counter for counting directly the number of coefficient updates (1000 times, for example), or the like.

$$H\_AV(k+1) = \frac{1}{M}\sum_{i=0}^{M-1} h(k+1, i) \quad (12)$$

The coefficient offset calculation section 60 compares H_AV obtained from expression (12) with a predetermined threshold th_H_AV (40 dBm0 in the present invention), and if $$th\_H\_AV < H\_AV \quad (13)$$

is satisfied, it is determined that the coefficient has an offset. Otherwise, it is determined that the coefficient has no offset component.

When it is determined that there is an offset component, the coefficient offset calculation section 60 outputs a switching signal for closing the contact "b" to the switches 31, 32, and 35, and the switch section 40. The operation when the contact "b" of the switches 31, 32, and 35, and the switch section 40 is closed has been described in the second embodiment.

Further, when the coefficient offset calculation section 60 determines that the coefficient has no offset, a signal for closing the contact "a" is output to the switches 31, 32, and 35, and the switch section 40. The operation when the contact "a" of the switches 31, 32, and 35, and the switch section 40 is closed has been described in the second embodiment.

Furthermore, in the fourth embodiment, a communication path containing HPFs 19*a*, 19*b*, and 19*c* and a communication path without HPFs 19*a*, 19*b*, and 19*c* is selected in accordance with the calculation result of the coefficient offset calculation section 60. However, the configuration may be different. For example, the HPFs 19*a*, 19*b*, and 19*c* may be variable filters having a plurality of filters, and the coefficient offset calculation section 60 may control the switches 31, 32, and 35 in accordance with the magnitude of the mean value of the coefficient.

(D-2) Effects of Fourth Embodiment

According to the fourth embodiment, the coefficient offset calculation section 60 is provided; the coefficient offset calculation section 60 obtains the mean value of the coefficient updated by the filter section 39 after a predetermined period of time or after a predetermined number of coefficient updates. If the mean value exceeds a predetermined threshold, it is determined that there is a coefficient offset component, a signal for closing the contact "b" is output to the switches 31, 32, and 35 and the switch section 40, and any offset of the coefficient is automatically removed. When the coefficient offset calculation section 60 determines that the coefficient has no offset, a signal for closing the contact "a" is output to the switches 31, 32, and 35 and the switch section 40, and unnecessary filtering is automatically avoided. Even if the communication line type or the type of the telephone set connected to both ends are not known, the offset component can be appropriately removed, preventing the performance of the echo canceller from being degraded, and the echo component can be removed to improve the speech quality.

(E) FIFTH EMBODIMENT

An echo canceller of a fifth embodiment of the present invention will next be described with reference to FIG. 9.

Figure 9:
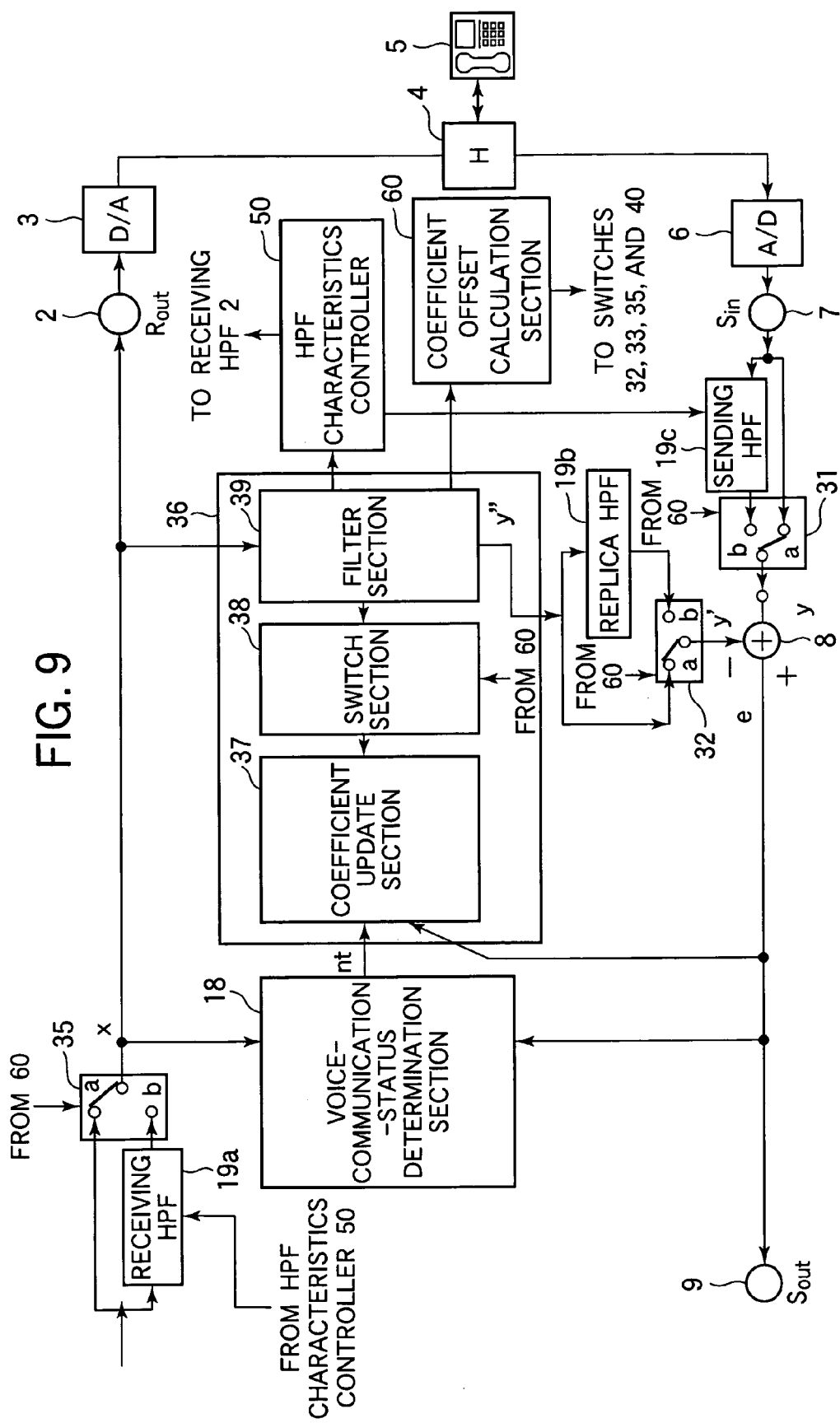
FIG. 9 is a block diagram for describing an echo canceller of the fifth embodiment.

The configuration of the fifth embodiment shown in FIG. 9 differs from the configuration of the fourth embodiment shown in FIG. 8 in that the HPF characteristics controller 50 used in the third embodiment is provided.

In FIG. 9, elements identical to those in the fourth embodiment shown in FIG. 8 and the third embodiment shown in FIG. 7 are denoted by the same reference marks.

With the HPF characteristics controller 50 included in the configuration of the fourth embodiment, the characteristics of the HPF can be optimized even if the communication line type is not known. The echo component can be removed more appropriately than in the fourth embodiment, irrespective of the communication line type or the telephone set type, and a high-quality echo-free voice call can be implemented.

More specifically, the offset component obtained from expression (12) in the fourth embodiment as well as the third embodiment is compared with a predetermined threshold, and the amounts of operations can be minimized to change (reduce) the HPF tap length calculated from the tap length in the third embodiment. As a result, a high-quality echo-free voice call can be implemented with optimum processing even in the DSP operations, irrespective of the communication line type and the telephone type.

(F) OTHER EMBODIMENTS (F-1) The first to fifth embodiments described above are not always applied to IP telephony supporting VoIP communication and can be applied also to the conventional telephone set supporting the conventional band.

(F-2) The first to fifth embodiments described above are applied to remove a line echo component caused by the processing of the hybrid circuit 4, and can also be applied to remove an echo component occurring between the speaker and the microphone of the telephone.

I claim:

1. An echo canceller for removing an echo component by using an adoptive algorithm, the echo canceller comprising:
   a pseudo-echo forming means including a pseudo-echo generation section for generating a pseudo-echo signal in accordance with a tap coefficient and a far-end input signal, and a coefficient update section for updating the tap coefficient;
   a sending filter means for removing a low-frequency component included in a near-end input signal component;
   a pseudo-echo filter means for removing a low-frequency component included in the pseudo-echo signal from the pseudo-echo forming means; and
   an echo cancellation means for removing an echo component included in the near-end input signal component passing through the sending filter means, and an echo component in accordance with a pseudo-echo signal passing the pseudo-echo filter means; and
   a receiving filter means for removing a low-frequency component from the far-end input signal component, the receiving filter means being disposed between a far-end input terminal and the pseudo-echo forming means;
   wherein the sending filter means, the pseudo-echo filter means, and the receiving filter means are variable filters;

the echo canceller further comprising a switch control means which detects presence or absence of a second band component on a sending path and a receiving path, the second band component being different from a first band component that is a conventional telephone band, the echo canceller controlling the removal frequency band of the sending filter means, the pseudo-echo filter means, and the receiving filter means in accordance with a result obtained by the detecting of the second band component.

2. The echo canceller according to claim 1, wherein the switch control means detects a low-frequency component included in the far-end input signal component and the near-end input signal component, and the frequency band to be removed by the sending filter means, the pseudo-echo filter means, and the receiving filter means is controlled in accordance with a power of the detected low-frequency component.

3. The echo canceller according to claim 1, wherein the switch control means controls a frequency band to be removed by the sending filter means, the pseudo-echo filter means, and the receiving filter means in accordance with a degree of influence on the tap coefficient updated by the coefficient update section by means of a non-fixed offset component of the far-end input signal in the low-frequency component.

4. The echo canceller according to claim 3, wherein the switch control means obtains a mean value of the tap coefficients updated by the coefficient update section, and the tap coefficient determines a degree of influence by the offset component in the low-frequency component included in the far-end input signal in accordance with a result of comparison between the mean value of the tap coefficient and a predetermined value.

5. An echo canceller for removing an echo component by using an adoptive algorithm, the echo canceller comprising:
 a pseudo-echo forming means including a pseudo-echo generation section for generating a pseudo-echo signal in accordance with a tap coefficient and a far-end input signal, and a coefficient update section for updating the tap coefficient;
 a sending filter means for removing a low-frequency component included in a near-end input signal component;
 a pseudo-echo filter means for removing a low-frequency component included in the pseudo-echo signal from the pseudo-echo forming means; and
 an echo cancellation means for removing an echo component included in the near-end input signal component passing through the sending filter means, and an echo component in accordance with a pseudo-echo signal passing the pseudo-echo filter means; and
 a receiving filter means for removing a low-frequency component from the far-end input signal component, the receiving filter means being disposed between a far-end input terminal and the pseudo-echo forming means;
 wherein the sending filter means, the pseudo-echo filter means, and the receiving filter means are variable filters;
 the echo canceller further comprising a filter characteristics control means for controlling the frequency band to be removed by the sending filter means, the pseudo-echo filter means, and the receiving filter means, in accordance with a tap length specified in the pseudo-echo forming means.

* * * * *